No. 711,839. Patented Oct. 21, 1902.
J. FELLOWS.
ANCHOR.
(Application filed May 19, 1902.)
(No Model.) 2 Sheets—Sheet 2.
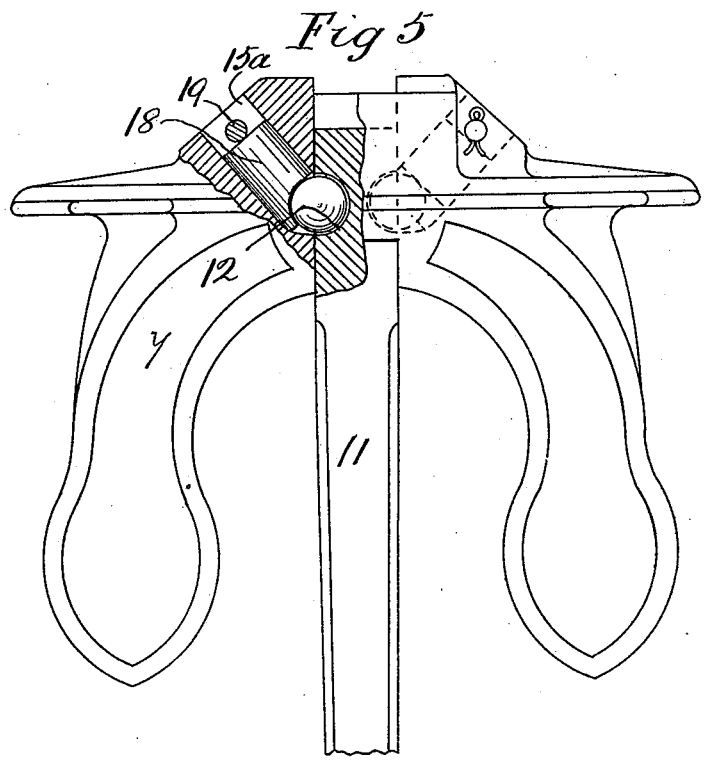
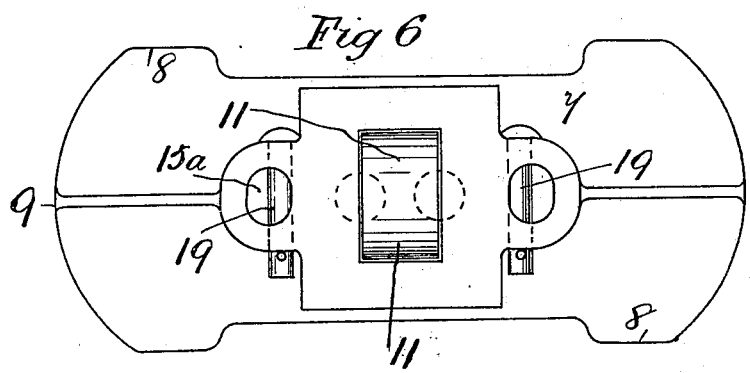
Witnesses
B Hayward Powell
J B Hayward
Inventor
John Fellows
per Charles J Powell
Attorney

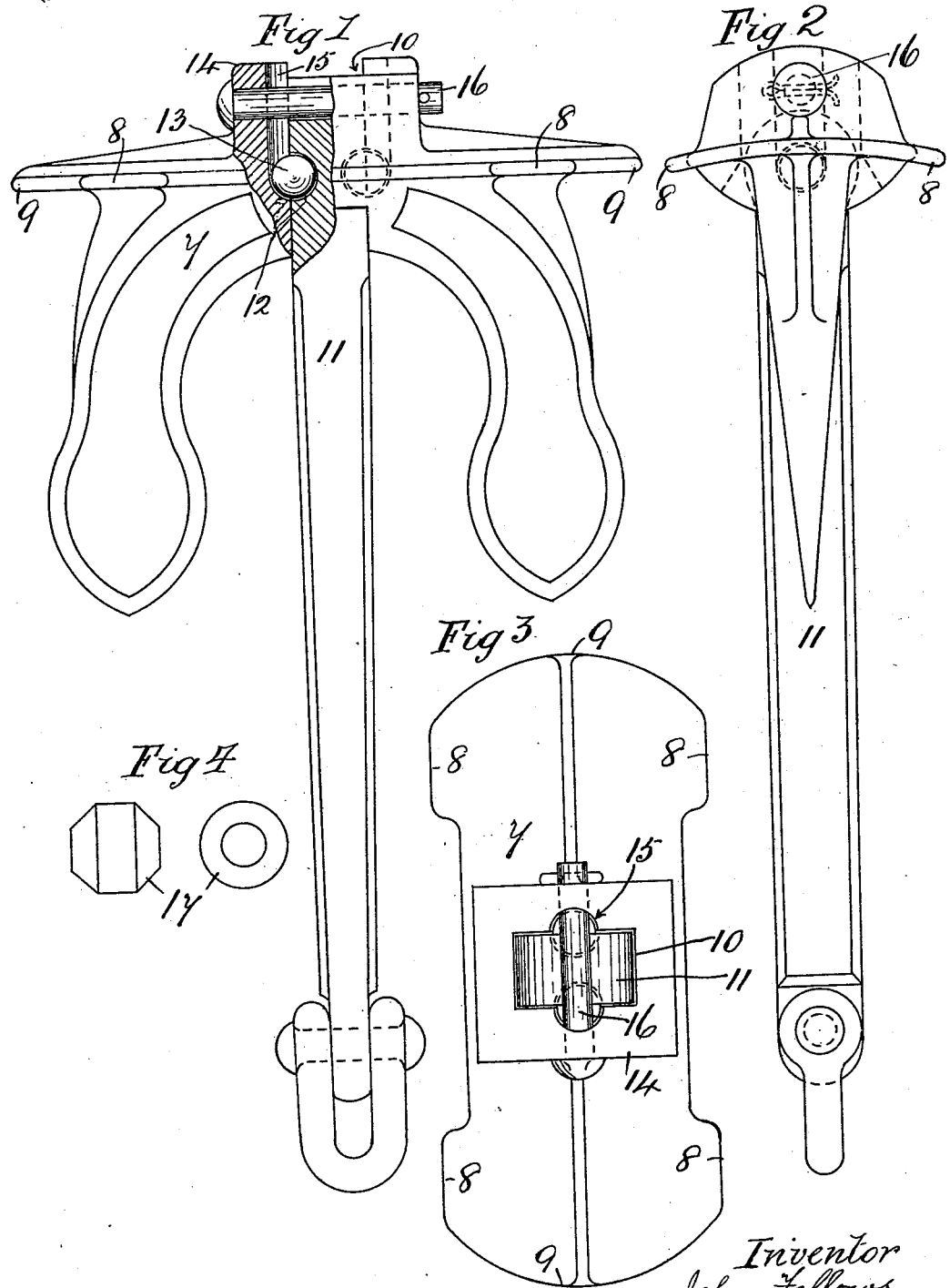

UNITED STATES PATENT OFFICE.

JOHN FELLOWS, OF CRADLEY HEATH, ENGLAND.

ANCHOR.

SPECIFICATION forming part of Letters Patent No. 711,839, dated October 21, 1902.

Application filed May 19, 1902. Serial No. 108,028. (No model.)

*To all whom it may concern:*

Be it known that I, JOHN FELLOWS, a subject of the King of Great Britain, and a resident of Compton Grange, Cradley Heath, in the county of Stafford, England, have invented new and useful Improvements in Anchors, of which the following is a specification.

My invention relates to improvements in anchors known as "stockless," and refers more particularly to the means whereby the shank is connected with the crown-piece. Hitherto the shank has been secured to the crown-piece in various patterns by means of a cross pin or bolt, upon which the shearing strain is very great, so as to frequently cause breakage. Such pins and bolts are also liable to rust in and become fast, which again increases their liability to breakage.

In this my invention my object is to remove these objections by substituting a ball or similar joint for the pin or bolt, as hereinafter described and shown in the accompanying drawings, in which—

Figure 1 is a part-sectional view of my invention. Fig. 2 is a side view, and Fig. 3 an end view, of the improved anchor. Fig. 4 is a side and front view of a modified bearing-ball. Fig. 5 is a part-sectional elevation, and Fig. 6 a plan view, of an alternative arrangement of inserting the bearing-balls.

Similar numbers refer to similar parts throughout the several views.

The crown-piece 7 is formed with the usual trips 8 and with the ends 9 well rounded in shape in order to prevent any liability of the anchor resting on its end at any time, and thus to insure canting over. In the middle of the crown-piece a straight through-hole 10 is made to receive the end of the shank 11, which latter is made to loosely fit therein. The hole is also suitably shaped at its front part to permit of the necessary range of movement of the shank. In the sides of the shank a hemispherical recess 12 is formed to accommodate the bearing-balls 13. Also in the walls 14 of the crown-piece half-round grooves 15 are made, terminating at their lower ends in a hemispherical form, agreeing with the similar recesses in the shank. The shank is pushed through the crown-piece until the balls may be passed into the recesses 12, when it is drawn downward into position, the outer portion of the balls sliding down the grooves 15. The pin 16 or other similar device is now secured to the crown-piece at the back of the end of the shank 11 to prevent its return movement. It will be readily seen that some variation in the shape of the bearing-balls may be made—as, for instance, shown at 17 in Fig. 4; but the true sphere appears to answer best. Also it will be apparent that the details of forming the passage of the bearing-balls to their position may be varied—for instance, as shown in Figs. 5 and 6, where the passage 15ª is made in an angular direction, down which the ball may be passed into its place and supported by rear block 18, which is held in by pin 19. The other parts of the anchor may be made of the usual patterns. By these means the opening in the head at the back of the shank affords sufficient room to permit of the escape of refuse, and so prevents jamming. Also the comparative strength is very much increased by dispensing with the usual crown-pin and by disposing the axial line of movement nearer the central position of the crown-piece than usual, also affording a much more easy swiveling and canting action than can be when a pin is used to secure the shank to the crown-piece, while its construction is very simple.

What I claim as my invention, and desire to secure by Letters Patent, is—

1. In an anchor, the combination with the shank and crown-piece, of a ball or a plurality of balls arranged between said shank and crown-piece, for the purpose specified.

2. In an anchor, the combination with the shank and crown-piece, of a ball or a plurality of balls arranged between said shank and crown-piece, and means for retaining said balls in place.

3. In an anchor, the combination with the shank and crown-piece, of a ball on each side of said shank fitting in a depression in said shank and in a corresponding depression in said crown-piece.

4. In an anchor, the combination with the shank and crown-piece, of a ball on each side of said shank, fitting in a depression in said shank and in a corresponding depression in said crown-piece, means for introducing said balls, and means for retaining said balls in place.

5. In an anchor, the combination with the shank and crown-piece, the crown-piece being provided with a hole for the reception of said shank, a groove along each side wall of said hole, a depression in each side of said shank, balls fitted in said depressions in the shank and in said grooves in the crown-piece, and means for retaining said balls in place.

6. In an anchor, the combination with the shank and crown-piece, the crown-piece being provided with a hole for the reception of said shank, a groove along each side wall of said hole, a depression in each side of said shank, balls fitted in said depressions in the shank and in said grooves in the crown-piece, and means for preventing backward movement of said shank in said crown-piece.

In testimony whereof I have hereunto set my hand in presence of two subscribing witnesses.

JOHN FELLOWS.

Witnesses:
CHARLES T. POWELL,
C. HAYWARD POWELL.